United States Patent
Tanko

(10) Patent No.: US 10,668,765 B2
(45) Date of Patent: Jun. 2, 2020

(54) SELF-AUTHENTICATING ARTICLES INCORPORATING PRECIOUS METALS

(71) Applicant: GOLDNOTE CORPORATION, Scarborough (CA)

(72) Inventor: David Tanko, Scarborough (CA)

(73) Assignee: GOLDNOTE CORPORATION, Scarborough (CA)

( * ) Notice: Subject to any disclaimer, the term of this patent is extended or adjusted under 35 U.S.C. 154(b) by 0 days.

(21) Appl. No.: 16/404,972

(22) Filed: May 7, 2019

(65) Prior Publication Data

US 2019/0337322 A1 Nov. 7, 2019

Related U.S. Application Data

(60) Provisional application No. 62/667,818, filed on May 7, 2018.

(51) Int. Cl.
*B42D 25/373* (2014.01)
*B42D 25/455* (2014.01)
(Continued)

(52) U.S. Cl.
CPC ............ *B42D 25/373* (2014.10); *B32B 15/08* (2013.01); *B42D 25/351* (2014.10);
(Continued)

(58) Field of Classification Search
CPC .... B42D 25/373; B42D 25/47; B42D 25/455; B42D 25/351; B42D 25/346; B42D 25/21;
(Continued)

(56) References Cited

U.S. PATENT DOCUMENTS

| 8,807,437 B2 | 8/2014 | Reed et al. |
| 2005/0072520 A1 | 4/2005 | Berman |

(Continued)

FOREIGN PATENT DOCUMENTS

| CN | 105270012 | 1/2016 |
| CN | 105989778 | 10/2016 |

(Continued)

OTHER PUBLICATIONS

International Search Report and Written Opinion PCT/IB2019/000469 dated Aug. 22, 2019; (11 pages).

(Continued)

*Primary Examiner* — Justin V Lewis
(74) *Attorney, Agent, or Firm* — K&L Gates LLP

(57) ABSTRACT

In part, the disclosure relates to articles of manufacture, such as banknote, that include one or more precious materials formed as unitary structure and that is secured within the article and disposed below one or more tamper resistant elements such that the article is self-authenticating. The articles may include polymer-based notes, instruments and other substantially planar articles defined by a boundary and an upper surface and a lower surface such that a precious material is at least in part co-planar with a third surface sandwiched therebetween. The disclosure also relates to a flexible precious metal storage apparatus that includes three layers, one layer defines a cavity. The cavity is sized and arranged to have a precious metal layer deposited, printed, injected, grown, or otherwise at least partially surrounded by the boundary of the geometric shape.

21 Claims, 7 Drawing Sheets

(51) Int. Cl.
| | |
|---|---|
| *B42D 25/351* | (2014.01) |
| *B32B 15/08* | (2006.01) |
| *B42D 25/47* | (2014.01) |
| *B42D 25/23* | (2014.01) |
| *B42D 25/29* | (2014.01) |
| *B42D 25/21* | (2014.01) |
| *B42D 25/328* | (2014.01) |
| *B42D 25/355* | (2014.01) |
| *B42D 25/346* | (2014.01) |
| *B42D 25/378* | (2014.01) |
| *B42D 25/387* | (2014.01) |
| *B42D 25/425* | (2014.01) |
| *B32B 3/28* | (2006.01) |
| *B32B 3/26* | (2006.01) |

(52) U.S. Cl.
CPC .......... *B42D 25/455* (2014.10); *B42D 25/47* (2014.10); *B32B 3/266* (2013.01); *B32B 3/28* (2013.01); *B32B 2255/10* (2013.01); *B32B 2255/26* (2013.01); *B32B 2307/412* (2013.01); *B32B 2425/00* (2013.01); *B42D 25/21* (2014.10); *B42D 25/23* (2014.10); *B42D 25/29* (2014.10); *B42D 25/328* (2014.10); *B42D 25/346* (2014.10); *B42D 25/355* (2014.10); *B42D 25/378* (2014.10); *B42D 25/387* (2014.10); *B42D 25/425* (2014.10)

(58) Field of Classification Search
CPC ...... B42D 25/355; B42D 25/23; B32B 15/08; B32B 3/28
USPC ............ 283/72, 74, 94, 98, 901; 206/8, 730, 206/733, 734
See application file for complete search history.

(56) References Cited

U.S. PATENT DOCUMENTS

2012/0067746 A1* 3/2012 Gremaud ................. A45C 1/10
283/85
2015/0283845 A1* 10/2015 Marcus ................ B42D 15/027
235/380

FOREIGN PATENT DOCUMENTS

| | | |
|---|---|---|
| CN | 106274138 | 1/2017 |
| GB | 2522618 | 8/2015 |
| RO | 130756 | 12/2015 |
| SK | 6064 | 4/2012 |

OTHER PUBLICATIONS

Third-Party Information Liability Disclaimer, Registration No. 173312, Date of Registration: Jan. 23, 2018, Title: Certificate of Plastic Film; (7 pages).

* cited by examiner

SELF-AUTHENTICATING ARTICLES INCORPORATING PRECIOUS METALS

CROSS REFERENCE TO RELATED APPLICATIONS

This application claims benefit of U.S. Provisional Application No. 62/667,818 filed May 7, 2018, the contents of which are incorporated herein by reference in their entirety.

FIELD OF TECHNOLOGY

The disclosure generally relates to the field of precious metals/materials and articles of manufacture incorporating the same. Specifically, the disclosure relates to self-authenticating articles that include, without limitation, banknotes and other instruments.

BACKGROUND

Many secure documentation and authentication systems use polymer or plastic material in secure documents to protect the document. Particularly with regards to currency, several countries use polymer banknotes or are considering doing so. Polymer substrate banknotes help reduce costs because they more durable and longer lived.

These notes serve as units of the currency and are medium of exchange. Historically, such currency has been subject to devaluation through inflation, fiscal mismanagement or political instability. Further, anti-counterfeiting protection has often been limited to some visual means such as a lens or lens array that is cast or embossed on the front or back of the banknote (or its transparent substrate or body) and by a corresponding image (e.g., a printed, embossed, holographic, or other image visible through the lens or lens array, which may be considered the image element or component) provided on the reverse side of the banknote.

In light of the foregoing, there remains a need for improved security features for banknotes and other instruments that provides enhanced or improved authentication. The present disclosure addresses this need and others.

SUMMARY

In part, the disclosure relates to articles of manufacture that include one or more precious materials and that are configured to be self-authenticating. The articles may include polymer-based notes, instruments and other substantially planar articles defined by a boundary and an upper surface and a lower surface such that a precious material is at least in part co-planar with a third surface sandwiched therebetween. The disclosure also relates to a flexible precious metal storage apparatus or article that includes three layers, one of which defines a cavity or hole formed in the middle layer. The cavity or hole defined by the middle layer may be sized and arranged to have any suitable shape. For example, the shape can include straight lines, curves, regular shapes, irregular shapes, and combinations thereof. The cavity or hole defined in a middle layer, core or substrate has a depth and other dimensions capable of receiving a precious metal. The metal can be a unitary workpiece, film or a layer deposited, printed, injected, grown, or otherwise at least partially surrounded by the boundary of the geometric shape.

In particular, the disclosure relates to self-authenticating articles that incorporate a precious metal. In part, the disclosure relates generally to articles, including, but not limited to, currency, banknotes, secure identification documents, and precious metal as currency. The disclosure further relates to authentication and anti-counterfeiting measures, and the use of polymer substrates. The articles disclosed herein are self-authenticating and further configured to be tamper resistant and difficult to counterfeit. The articles also have improved tear resistance.

In part, the disclosure relates to a self-authenticating article. The article may include one or more anti-tampering elements; a first polymer layer; a second polymer layer; a third polymer layer sandwiched between the first polymer layer and the second polymer layer, wherein the third polymer layer defines a cavity, the cavity defined by a border; and a solid unitary structure comprising a precious metal disposed in the cavity, wherein the one or more anti-tampering element is disposed relative to the border.

The article may further include a visible indicium positioned relative to the precious metal and indicative of one or more parameters associated with the precious metal. In one embodiment, the one or more parameters comprise a hallmark, a purity level and a weight, each associated with the precious metal. In one embodiment, the hallmark indicates that the precious metal was produced by a London Bullion Market Association (LBMA) accredited refiner. In one embodiment, one or more of the first polymer layer and the second polymer layer are optically transparent.

The one or more anti-tampering elements are selected from the group consisting of a hologram, a magnetic thread, micro-perforations, foil, optically verifiable indicia, surface embossing, intaglio ink, optically variable ink, ultra-violet ink and micro-RFID technology. In one embodiment, the precious metal is patterned such that appearance of precious metal changes when viewed from two or more viewing angles. In one embodiment, the article has a length, a width and a thickness, wherein the thickness is substantially uniform along the length of the article. In one embodiment, the length ranges from about 6 inches to about 6.5 inches, wherein the width ranges from about 2.5 inches to about 3 inches.

The article may further include an adhesive disposed on the first polymer layer and the second polymer layer such that the third polymer layer is bonded to each of the first polymer layer and the second polymer layer. In one embodiment, the first polymer layer is thermally bonded to the third polymer layer. In one embodiment, the first polymer layer and the second polymer layer are cross-linked with each other, wherein the first polymer layer and the second polymer layer are optically transparent, such that the solid unitary structure is visible through each such polymer layer. In one embodiment, the first polymer layer includes a first optically transparent window, wherein the second polymer layer includes a second optically transparent window the cavity is aligned with the first optically transparent window and the second optically transparent window such that the precious metal is visible upon inspection of the article. In one embodiment, the article has a specified weight displayed on one or both of the polymer layers, wherein the specified weight is the weight of the solid unitary structure. In one embodiment, the article is selected from the group consisting of a banknote, a currency, a bearer instrument, a certificate, a ticket, a license, a government issued document and a legal document. In one embodiment, the first, second and third layers are laminated together.

In part, the disclosure relates to a self-authenticating article. The article may include an optically transparent upper polymer layer; an optically transparent lower polymer layer; a unitary solid defined by a top surface, a bottom surface and a thickness, the unitary solid disposed between the upper polymer layer and the lower polymer layer; and one or more anti-tampering elements arranged relative to a border defined by the unitary solid. The article may further include comprising a middle polymer layer also referred to as a core or core layer that is sandwiched between the upper layer and the lower layer, wherein the middle layer defines a cavity, the cavity defined by a border, the precious metal disposed in the cavity.

In part, the disclosure relates to a self-authenticating article. The article may include one or more anti-tampering elements; a first polymer layer comprising an optically transparent window; a second polymer layer comprising a second optically transparent window; a third polymer layer sandwiched between the first polymer layer and the second polymer layer, wherein the third polymer layer defines a cavity, the cavity defined by a border; and a solid unitary structure comprising a precious metal disposed in the cavity, wherein the one or more anti-tampering elements is disposed relative to the border. In one embodiment, the one or more anti-tampering elements are selected from the group consisting of security print from special inks and processes, embossed foil, holograms, serial numbers, glyphs, bar codes, and other elements. In various embodiments, the self-authenticating article includes a unitary solid, wherein the unitary solid is a precious metal. In various embodiments, in the precious metal is gold, platinum, or silver.

Although, the disclosure relates to different aspects and embodiments, it is understood that the different aspects and embodiments disclosed herein can be integrated together as a whole or in part, as appropriate. Thus, each embodiment disclosed herein can be incorporated in each of the aspects to varying degrees as appropriate for a given implementation. Furthermore, although some aspects and embodiments are described using "means for" terminology, it is understood that all aspects, embodiments, and other concepts disclosed herein can serve as support for means plus function claims, even if specific "means for" language is not used in a specific portion of the written description.

BRIEF DESCRIPTION OF DRAWINGS

Various features of the embodiments described herein, together with advantages thereof, may be understood in accordance with the following description taken in conjunction with the accompanying drawings in which.

DETAILED DESCRIPTION

Figure 1A:
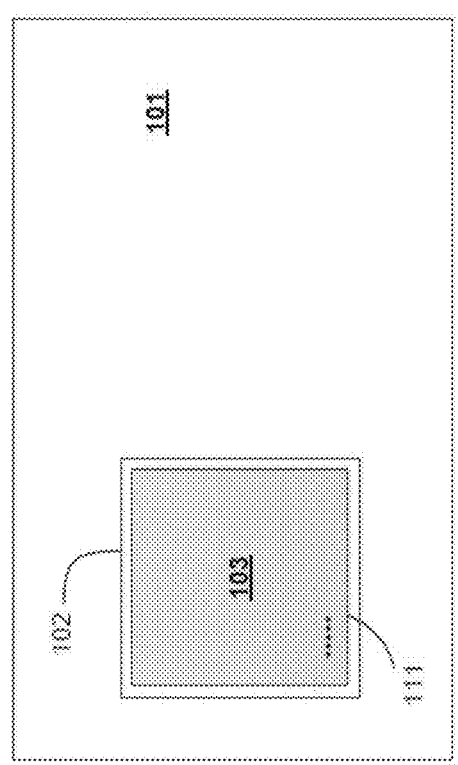
FIGS. 1A-C are top views of the various articles according to illustrative embodiments of the disclosure.

In the following detailed description, reference is made to the accompanying drawings, which are herein included as a portion of the present disclosure. In the drawings, similar symbols and reference characters typically identify similar components throughout the several views, unless context dictates otherwise. The illustrative aspects described in the detailed description, drawings, and claims are not meant to be limiting. Other aspects may be utilized, and other changes may be made, without departing from the scope of the subject matter presented in the present disclosure.

In part, the disclosure relates to various articles that incorporate, store, or otherwise secure one or more precious metals or other precious materials. In a preferred embodiment, the article is a banknote or similar value indicating instrument. The precious metals can include gold, platinum, silver, etc., but other metals and metal alloys can be used without limitation. Precious materials such as gems, fossils, relics, autographs, finger prints, and other items of value can also be used in their native form or upon crushing, slicing or other processing as appropriate. In this way, the article can be a display vehicle for a collectable or other item of personal or intrinsic value. In various embodiments, the articles are designed to be self-authenticating and suitable for conveyance between two parties while also including elements to display the precious metal or materials.

The self-authenticating article may include a transparent window defined by a border, wherein the window is an optically transmissive domain arranged in an upper layer and a bottom layer such the optically transmissive domain of each such layer may be aligned. Each layer or just one or more layers may be transparent or be opaque or substantially opaque with a transparent window constituting a region of one or more layers. Further, a third or middle layer having a region defined by a hole or cavity therein is sized such that it can be aligned with the transparent windows of the upper layer and the bottom layer. These layers are polymers, chemically treated paper, or other materials in various embodiments.

The present disclosure relates to various articles that featuring security printing and graphics. An article typically includes multiple layers of laminated materials, such as polymer layers or sheets, which securely contain a precious metal. In one embodiment, the precious metal is a precious metal of predetermined weight set, formed, or disposed in a cavity in the core layer or middle layer of the article. The precious metal may be enclosed within a transparent window provided by the outer transparent layers or all layers may be optically transparent. The cavity or hole which receives the precious metal is defined by one or more layers of the article and can be formed by any suitable means. In one embodiment, multiple smaller layer pieces, such as rectangles or strips, or other shapes are arranged to form the middle layer with a gap left to receive the precious material. The cavity or hole can be cut, etched, stamped, molded, laser cut, die cut, or formed by any suitable physical, chemical, electrical or optical phenomena, or other phenomena without limitation. One or more folds, pockets, origami defined shapes or domains can also be used to form the article and secure the precious material.

The articles of present disclosure are a significant improvement over paper articles and other notes and documents. Various articles are disclosed herein and will now be described in further detail. The article can be used to bestow intrinsic value in the currency note, and to provide inherent authentication of a valid currency note. In one embodiment, the article is an alternative currency product that may be used as a secure store of an intrinsic value by combining the value of gold or other precious metal and the security of a polymer substrate article.

The article is further designed to include a weight-based authentication feature. In one embodiment, the article is a banknote or another article that includes a unitary metal object that is made from gold or another precious metal. The weight of the unitary metal object is incorporated into or on the article such that it is viewable when looking at the article. In this way, a 10 gram banknote article contains 10 grams of gold. This specified gold weight is displayed on the article. The total weight of a given article includes various components such as polymers, inks, and additional security features. The components of the article along with the unitary precious metal object will exceed 10 grams and will likely be about 12 grams for the total weight. The foregoing is an example and various "denominations" or "weights" of the article can vary without limitation based on the weight and/or purity of the precious metal used in a given article.

In one embodiment, the total weight of the article is encoded and displayed on the article for detection by user inspection or a machine readable device. In one embodiment, the specified weight of the gold object is encoded and displayed on the article for detection by user inspection or a machine readable device. Typically, the weight of such an article is heavier relative to a paper note which is around 1 gram in weight.

In general, the disclosure is provided in the context of articles of manufacture that are suitable for representing or conveying value or imparting significance to the article. Thus, they can be used in a diploma or a ticket to an exclusive event in addition to use as a banknote. In one embodiment, the articles are suitable for transport and transfer between end users, which can include individuals or corporate entities such as banks, exchanges, countries, etc. The article can include preformed folds or two or more cavities to accommodate folding of the article. In a two cavity embodiment, the precious metal can be separated from a central folding region.

The articles of manufacture can include, without limitation, containers, banknotes, tickets, certificates, diplomas, awards, bearer instruments, stock certificates, commodity contracts, birth certificates, credit cards, debit cards, added value cards, coupons, notes, deeds, legal instruments, wills, and any other suitable documents, currencies, legal tender, or other representations of value or exchange.

Figure 1C:
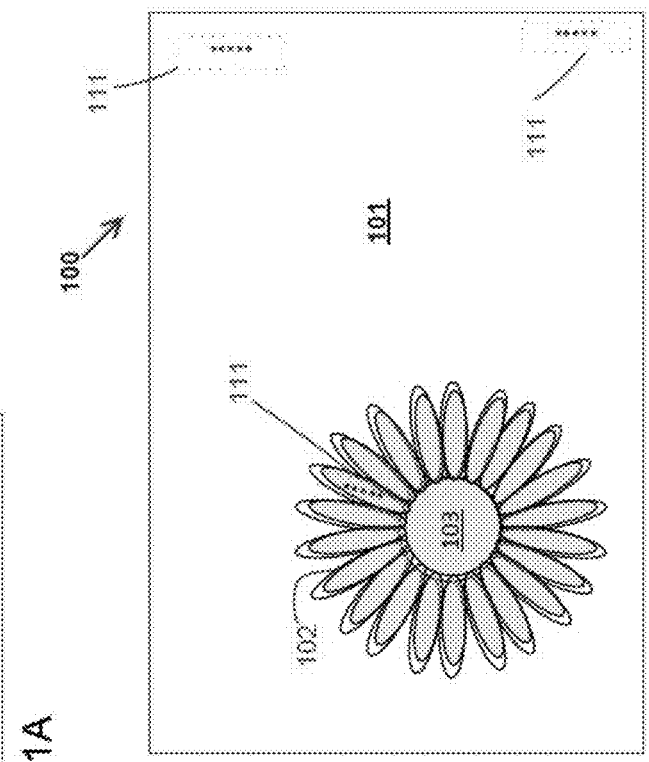
Figure 1B:
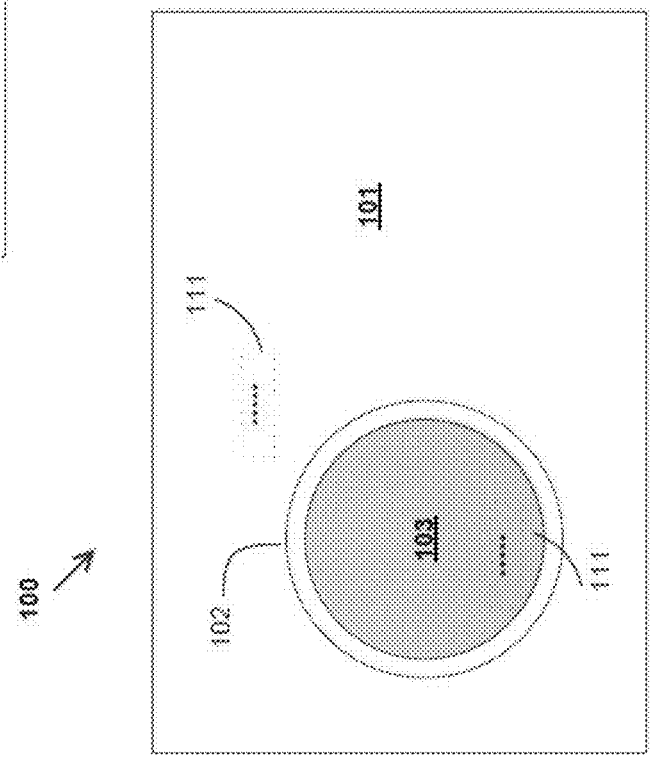

FIGS. 1A-C are various top views of one embodiment of the article. In one embodiment, article 100 includes a top polymer layer 101. Although various reference numbers are used between the figures, each article shown is its own embodiment or multiple embodiments. The top polymer layer 101 comprises a transparent polymer window 102. In one embodiment, the polymer window 102 is transparent through the entire body of the article in one embodiment or localized to a region in some embodiments. The window 102 lies over a cavity or hole that houses or otherwise secures a precious material 103. The depth of the cavity ranges from about 50 microns to about 200 microns. In one embodiment, the thickness of the unitary metal solid precious metal ranges from about 100 microns to about 200 microns. Precious material includes precious metal and other materials as disclosed herein. In one embodiment, the window is not a specific region or shape, but exists because the top polymer layer and the bottom polymer layer are optically transmissive.

In one embodiment, the article comprises a polymer material, a co-polymer material or other suitable cross-linkable material. Top layer 101 can include a polymer material. A bottom layer, not shown, can also be formed from a polymer. The polymer material may be any one of generally available synthetic plastics films such as polypropylene, nylon, PET (polyethylene terephthalate) or other similar plastic film or sheet made from polymer exemplifying certain characteristics such as flexibility, toughness, tear-resistance, and impermeability to most liquids and transparency.

In one embodiment, one or more layers of the article include or are formed from a polymer material. In one embodiment, the central layer is opaque while the other layers are optically transparent or partially optically transmissive/transparent. In one embodiment, the core-layer and the unitary solid metal element will be of the same thickness such that the exterior surface is uniform and substantially planar or planar after lamination. In one embodiment, the thickness of the unitary metal element is adapted to conform to that of the core or middle layer of the article.

In one embodiment of the present disclosure, the article 100 has dimensions of about 150 mm by about 70 mm. In one embodiment of the present disclosure, the article 100 has dimensions of about 156 mm by about 66 mm. In one embodiment of the present disclosure, the article 100 has dimensions of about 152 mm by about 60 mm. The article can have any suitable length and width. In one embodiment, the article is sized to facilitate a person carrying it and thus can range over sizes for banknotes, standard paper sizes and various other dimensions. Currently, most countries employ rectangular currency notes that are 2 to 3 inches in width by 4 to approximately 6 inches in length.

In general, polymer articles have a thickness in the range of 65 to 100 microns. For example, some articles have a substrate or body that is 75 microns thick while ink and/or other deposited materials on its outer surfaces increase the overall thickness by about 10 to 20 microns such that the overall thickness of the article is 85 to 95 microns. In one embodiment, the length and width of an article is about 75 mm×about 160 mm.

In one embodiment, the length, width, and thickness of a given article can vary without limitation and each of these dimensions may be greater than, equal to, or less than a corresponding dimension of a country's currency. In some embodiments, the thickness of a given article can range widely, but is typically selected to house the precious material 103 such as a given precious metal. In some embodiments, a uniform thickness will be maintained across all portions of the article. In other embodiments, the article will be of a varying thickness.

For example, the thickness can vary based on the inclusion of anti-tampering/anti-counterfeiting elements relative the precious metal or other regions of the article. The use of a cavity to house material 103 allows the thickness of the article to remain uniform and avoids a bump or bulge relative to the material's placement relative to the other constituent layers.

In one embodiment, the transparent window 102 is in a square shape as seen in FIG. 1A. In other embodiments, the transparent window 102 may be in any suitable shape and size. Some exemplary embodiments may be seen in FIGS. 1B and 1C. FIG. 1C shows a flower pattern that is formed with a precious metal. The flower pattern is but one example and any suitable shape or set of shaped regions defined by various borders can be fabricated. Anti-tampering elements are typically arranged relative to the border in order to safeguard the precious metal. In this way, the unitary precious metal structure, such a wafer or fiche, is secured in the article. If an attempt is made to cut it out or otherwise remove or replace it, the article is destroyed or the tampering is made self-evident upon visual inspection of the article.

In one embodiment, the precious material 103 housed in the article is a gold layer, structure, film, workpiece or fiche. The gold material housed in the article imparts intrinsic value that does not exist in conventional banknotes which are subject to devaluation. The precious metal, such as a gold layer or film, represents a specific weight and purity of gold thereby fixing the minimum value of the article at the current price of gold for this weight. An indicium or mark 111 evidencing one or more parameters associated with the precious metal/material 103 is included in various articles and has the benefit of making the article self-authenticating.

In other embodiments, the precious material 103 may be any precious material or metal that may give value to the banknote including, but not limited to platinum, silver, and one of any number of precious stones. In one embodiment, the precious metal is a unitary element that is safeguarded from removal, counterfeiting, or replacement using one or more anti-tampering elements or anti-counterfeiting elements. Various inorganic materials can be used in lieu of or in addition to the precious metal in some embodiments. In one embodiment, the precious metal is in the form of a unitary workpiece such as a wafer, a round, coin, a fiche, a block, a parallelepiped, or other suitable elements.

Figure 2:
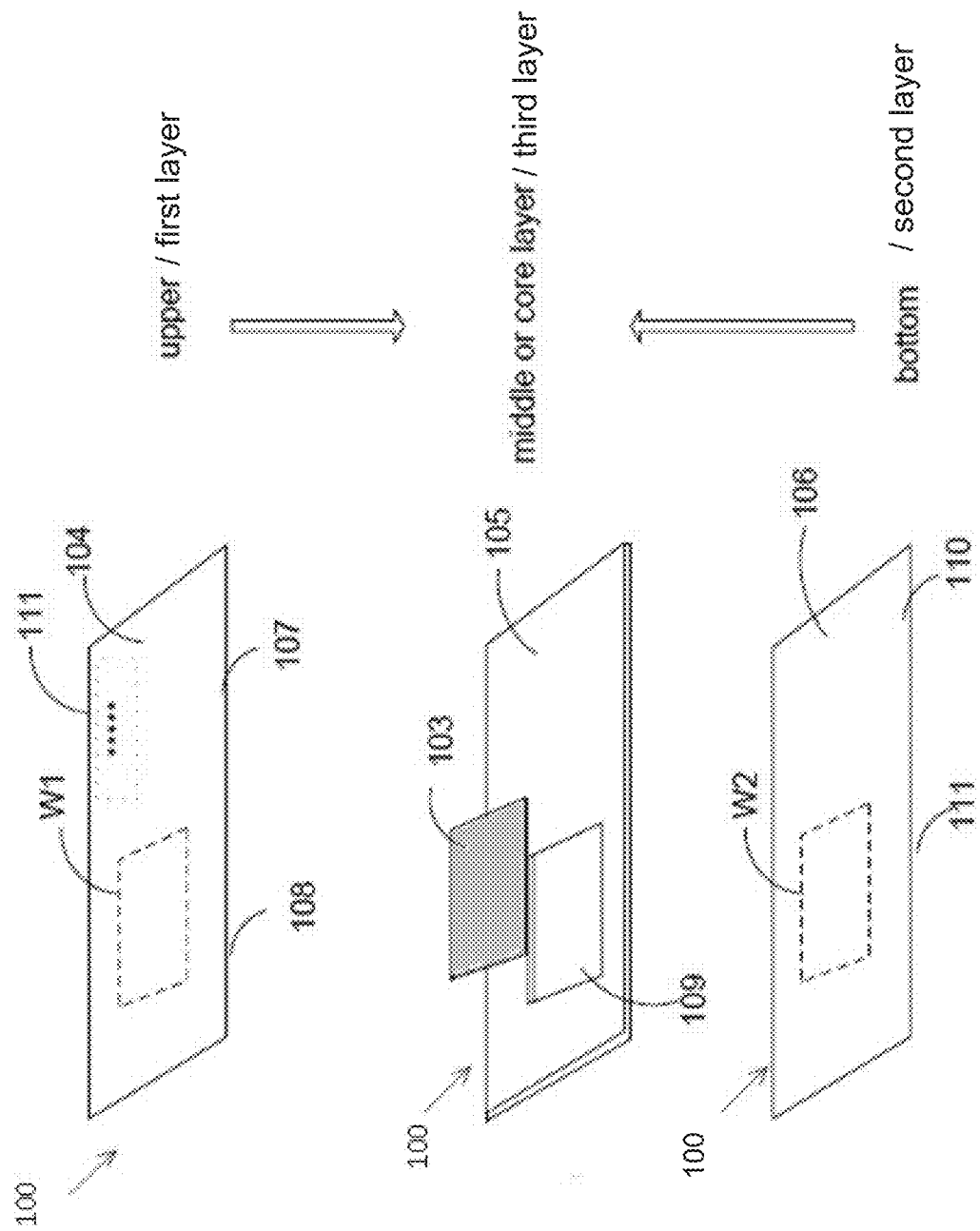
FIG. 2 is a perspective exploded view of a multi-layer article according to illustrative embodiments of the disclosure.

FIG. 2 illustrates a multilayer article 100. In one embodiment, the multilayer article comprises three layers 104, 105, 106. The upper or top layer 104 sandwiches a middle or core layer 105 along with bottom layer 106. The top layer 104 comprises a first surface 107 and a second surface 108. The first surface 107 comprises material that is printable. In one embodiment, all surfaces of the article are printable. The first surface 107 comprises marking and symbols 111 denoting the value of the article. The top layer 104 may comprise a window W1 to display the precious material 103 housed in the article.

A second window W2 matched and that is alignable with the first window W1 can be defined or formed in the bottom layer 106. In some embodiments, the window(s) is optically transparent. The entire top and bottom layers can be optically transparent or opaque in some regions. As used herein, "optically transparent" refers to a layer, compound, or material that transmits visible light such that the human eye may see through the applicable layer, compound or material.

In other embodiments, the entire top layer 104 may be transparent. In some embodiments, the first surface 107 may comprise additional elements to provide visual authentication of the currency article and its value. The second surface 108 comprises an adhesive coating. In one embodiment, the upper polymer layer is adhered to the bottom polymer layer such that cross-linking occurs between the polymers of each respective layer. In one embodiment, one or more layers of the article are attached, linked, or bonded using an adhesive such as one or more of Ethylene-vinyl acetate, epoxy, hot melt adhesive, cross-linking agent, or other similar hot melt, dry bond or pressure sensitive adhesives. The second surface 108 adheres to the middle layer 105. In some embodiments, heating is used to thermally bond layers in lieu of an adhesive. Cross-linking or other similar adhesion mechanisms are desirable because they provide enhanced tamper-resistance to the article by guarding against de-lamination. Any adhesives that guard against delamination may be used in various embodiments. Further, adhesives that show attempts to tamper with an article such as via color changes or other indicium are also useful in various embodiments. The middle layer 105 comprises an optically transparent or opaque core polymer material or other material.

In one embodiment, the middle layer 105 is thicker than the top layer 104 and the bottom layer 106. The precious material 103 is secured in the middle layer 105 in a cavity or hole 109. In one embodiment, the precious material 103 is a gold fiche or other gold layer or work piece or structure, and the middle layer 105 has the same thickness as the material 103. The middle layer 105 is configured between the top layer 104 and the bottom layer 106 such that the middle layer 105 is laminated by the top and bottom layers 104, 106. Windows W1 and W2 are aligned with precious material 103 in some embodiments. In some embodiments, the middle layer 105 comprises a printable material on both sides of the layer. In some embodiments, the middle layer 105 further comprises visual authentication methods.

Still referring to FIG. 2, the gold fiche 103 secured in the die-cut window 109 is of a specific weight, dimension and purity which is laminated within the three layers of polymer substrate utilizing a proprietary process. In some embodiments, the embedded gold material 103 is stamped with the refiners hallmark, the purity level, and the weight which certify authenticity and value such as shown by mark 111. Users of the article may use this mark to visually identify and authenticate the article.

In this way, the mark or indicium on, in, or in the vicinity of the precious metal or otherwise some surface of the article provides a self-authenticating function which is difficult to counterfeit since it is embedded within polymer. The inclusion of anti-tampering elements relative to the zone or region around the precious metal provide further security and also further enhance the self-authenticating nature of the article.

In one embodiment, the upper or first layer of the article includes an adhesive coating on one surface. In one embodiment, the adhesive side faces down. In one embodiment, the adhesive side adheres to core layer. In one embodiment, the upper or first layer is non-adhesive and printable. The article may include precious metal/precious material of specific weight, dimension and purity. In one embodiment, the core layer/third layer includes a transparent or opaque core polymer layer. The core layer/third layer may be same or substantially same thickness of precious metal/precious material such as a fiche. The core layer/third layer can incorporate a cut or formed window/cavity to accommodate precious metal/material layer/fiche. The third layer can be printable on one or both sides. The second or bottom layer can be the same as the first or top layer but with some or all components or additives inverted. The second layer can include adhesive coating on one surface. The adhesive side faces up. In one embodiment, the adhesive adhere to the core/middle layer/third layer. In one embodiment, the bottom or outer side of second layer is non-adhesive and printable. In one embodiment, the first and second layers sandwich the third layers. The references to first, second, and third layers can be changed and swapped in order for various embodiments.

In one embodiment, the mark or indicium 111 of the article evidences that a London Bullion Market Association (LBMA) accredited refiner prepared the precious metal present in the article. Other forms and patterns for such marks or indicium can be shown or formed on or in one or more layers of the article to prevent tampering. In one embodiment, the article will include information in the form of barcodes, glyphs, specialized characters or printing or other machine readable elements that are readable using a scanner, machine visions system, or mobile device via its camera and installed software. These elements can be disposed along the border of the transparent window and used to safeguard and authenticate an article to show that it has not been tampered with and as such not counterfeit or otherwise devalued.

The precious material 103 used in the article imparts intrinsic value to the article. The encapsulating polymer outer layers 104, 106 provide a tamper-resistant security shield which protects the gold or other materials, deters tampering and provides the surface upon or within which to print, emboss or embed unique security artwork and other security identification features. In some embodiments the middle layer 105 may be comprised of a synthetic paper and include anti-counterfeiting/anti-tampering devices such as magnetic strips, watermarks, machine readable elements, holograms, magnetic strips, specialized inks and printing and other suitable elements to prevent tampering or unambiguously indicate that tampering has occurred.

The bottom layer 106 comprises a first surface 110 and a second surface 111. The first surface 110 comprises an adhesive coating. The first surface 110 adheres to the middle layer 105. The second surface 111 comprises material that is printable. The second surface 111 may comprise marking and symbols denoting the value of the article. The bottom layer 106 may also comprise a transparent window W2 to display the precious material 103 housed in the article. In other embodiments, the entire bottom layer 105 may be transparent. In some embodiments, the second surface 111 may comprise additional elements to provide visual authentication of the currency article and its value.

The three-layer embodiment illustrated in FIG. 2 allows the precious metal 103 to be secured inside the middle layer 105, which is laminated within two polymer layers 104, 106. These layers may be transparent. This design results in a flat exterior surface plane or a substantially planar article compared to other embodiments wherein the inclusion of the gold would result in an uneven surface. In one embodiment, the three-layer design results in a product of uniform dimension free of "bumps' that would effectively prevent surface printing by conventional printing presses, which require perfectly flat surfaces.

Furthermore, this dimensional uniformity allows multiple units of a given article embodiment to be stacked in the same aspect (all obverse sides facing up and reverse sides facing down) in uniform packets and bundles, much like conventional banknotes. Uniform bundles may not be possible in the case where of notes with one side thicker than another. In other embodiments, the banknote may have one or more raised portions of varying thickness. This varying thickness will better accommodate the precious material and may provide sensory authentication to the article.

Figure 3:
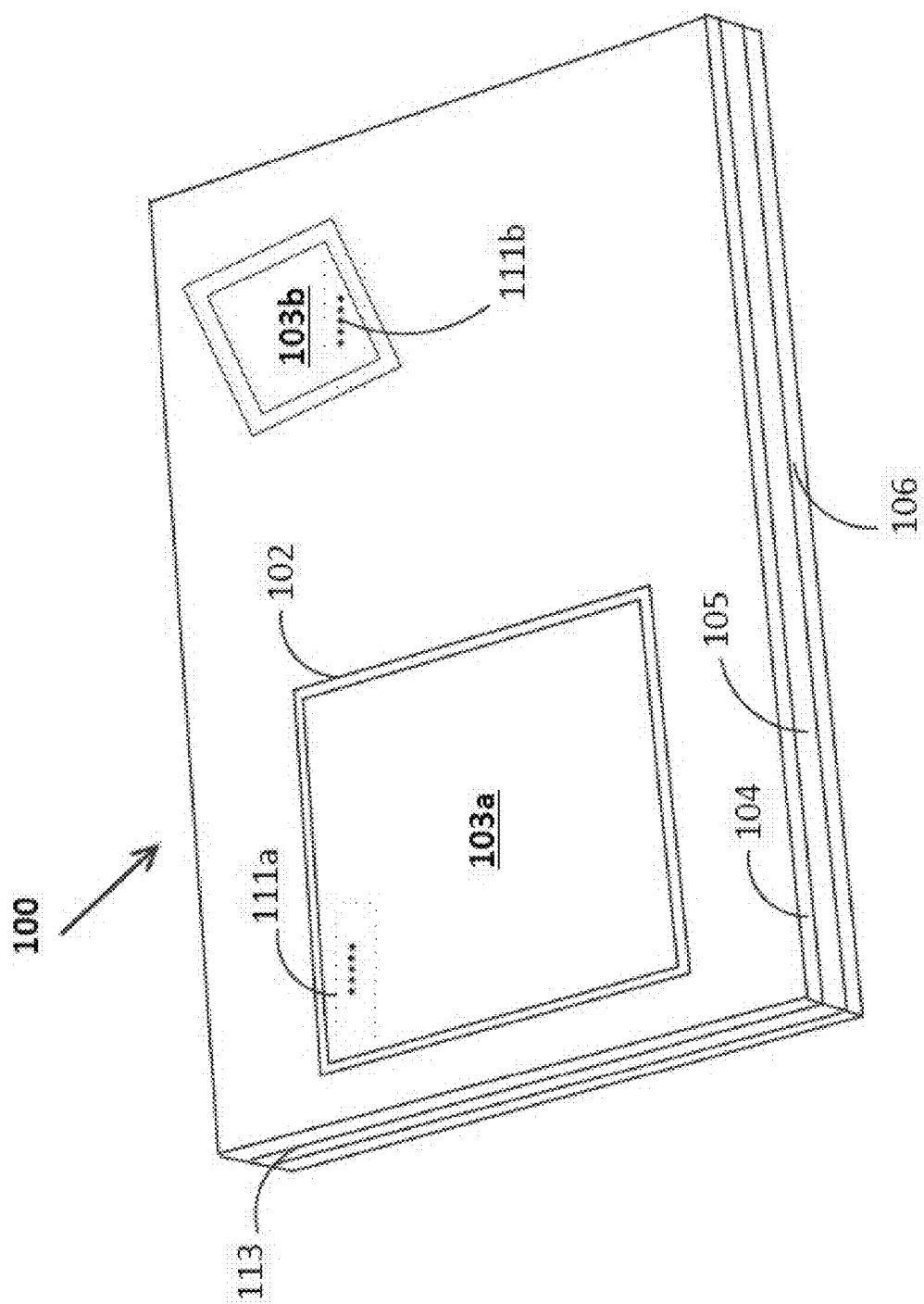
FIG. 3 is a perspective view of an exemplary assembled multi-layer article according to illustrative embodiments of the disclosure.

FIG. 3 illustrates a perspective view of another embodiment of an article 100 once the layers are adjoined and the middle layer 105 is laminated or bonded between the top layer 104 and the bottom layer 106. The layers are joined together by an adhesive 113 between each layer. The article 100 has sufficient thickness to house the precious material 103 in the cavity of the middle layer and visible through window W1. The thickness of the article may be uniform or may vary across the article. Preferably, the middle layer 105 is sized and arranged relative to the cavity defined therein that houses the precious metal such that the thickness of the article is substantially uniform along one or more dimensions of the article. In one embodiment, two indicium 111a and 111b are shown as are two regions 103a, 103b with a precious metal incorporated into the article.

Figure 4A:
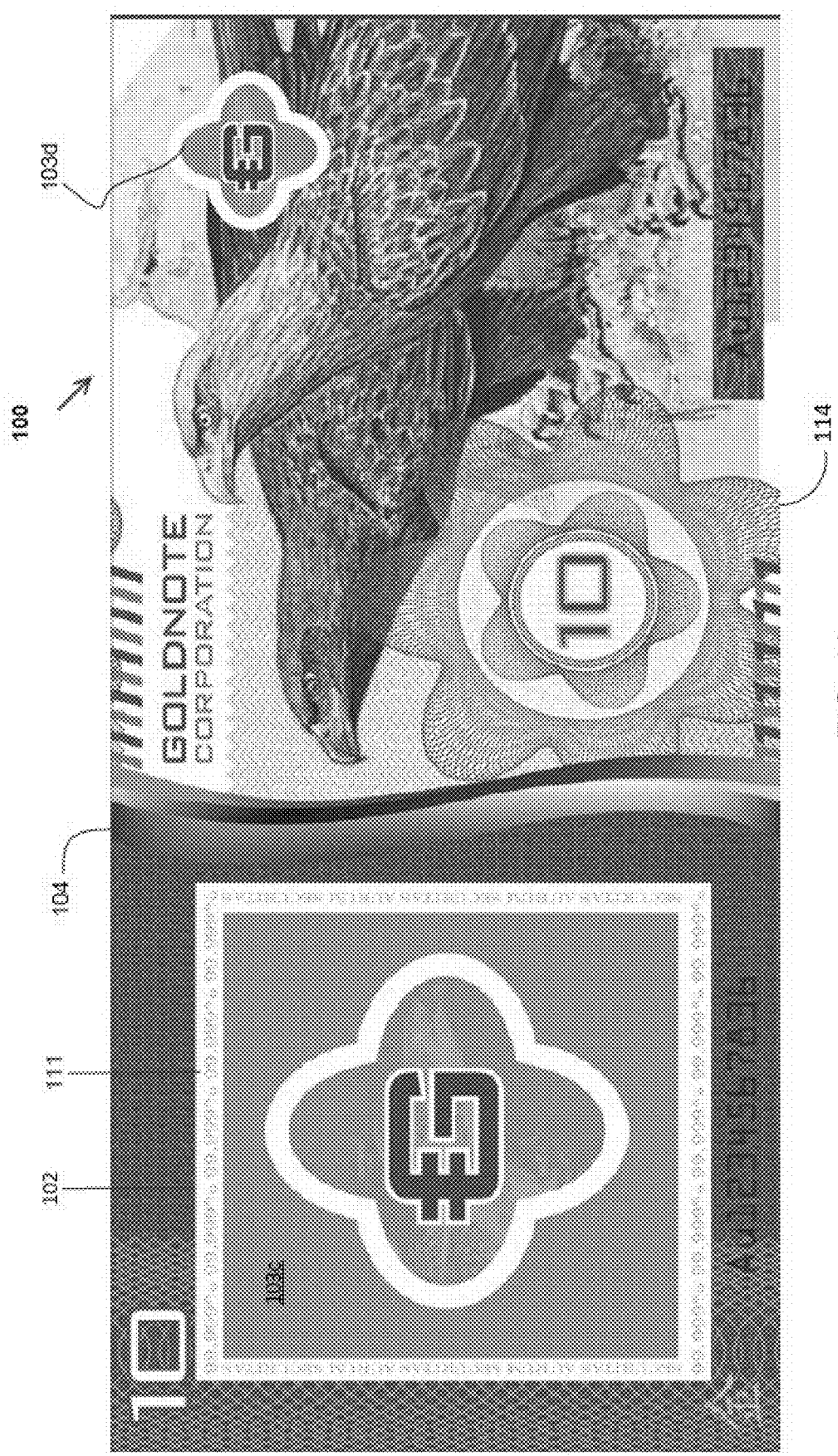
FIGS. 4A-4B are exemplary top and bottom views of an exemplary article according to illustrative embodiments of the disclosure.
Figure 4B:
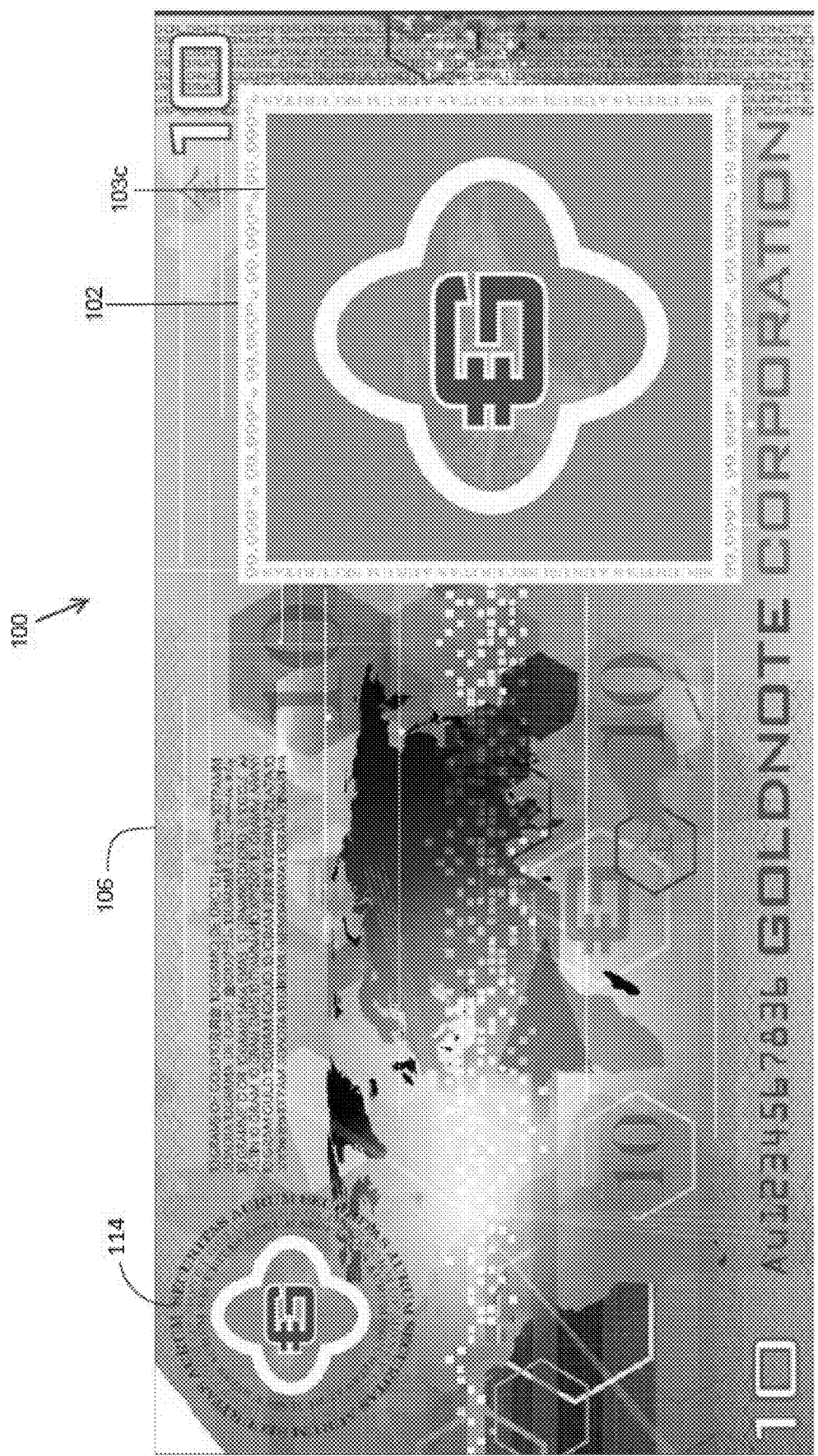

FIGS. 4A and 4B illustrate the top and bottom views of the article 100 that includes the precious material such as gold 103. The stamped precious metal layer or workpiece 103 and various printed and embedded security features 114 are designed to provide easy authentication and to prevent tampering or adulteration. These features combine to ensure that the multi-layered polymer article is recognized as a secure repository of value and integrity.

Accordingly, each article provides an easily authenticated method of exchange and a portable store of intrinsic value, based upon the fundamental value of gold without the possible concerns of authenticity associated with bullion or gold coinage. Specifically, gold in the form of bullion or coins are subject to adulteration or debasement. Various marks or indicium 111 for self-authentication can be used.

Furthermore, gold bars, wafers and coins may be difficult to carry. The multi-layered polymer article comprising a precious metal workpiece 103, which is of similar dimension to a typical dollar banknote, can be placed in a wallet or stacked in bundles. Each individual unit of the article exhibits branding features including security printing and compelling artwork characterized by symbolic motifs designed to express high production quality, intrinsic value and immutable authenticity. The appearance of the article 100 can be of any suitable designs. A pattern of multiple metal containing regions 103c, 103d can be used in one embodiment.

In one embodiment, the article further relies upon the secure production methods and the product of certified precious metals refiners that incorporate government mandated purity and origin marks. Each precious metal workpiece can include with limitation a layer, a domain, a sintered material, a fiche, or other structure or object that includes or is formed from a precious metal. The same applies to embodiments in which a precious material is used in lieu of or along with a precious metal.

Figure 5:
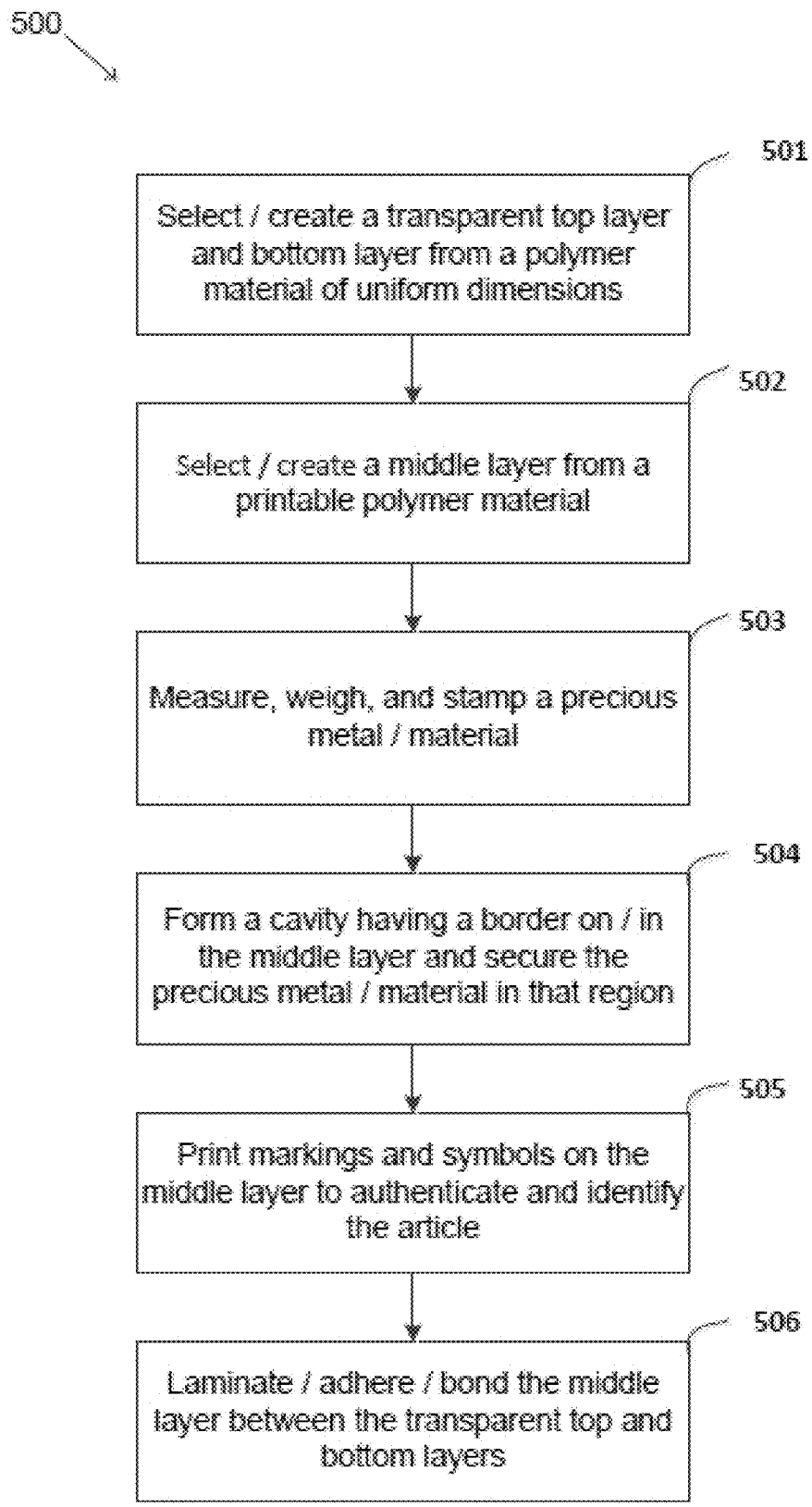
FIG. 5 is a flowchart of a method to create an exemplary article according to illustrative embodiments of the disclosure.

FIG. 5 is a flowchart 500 illustrating the method of creating a multi-layered polymer article. In general, in various embodiments the article is a banknote or other article as described herein. First, a top layer and a bottom layer are selected or created comprising a polymer material 501. In one embodiment, the two layers comprise an optically transparent material. In other embodiments only certain parts of the two layers are transparent. Second, a middle layer is selected or created comprising a printable polymer material 502. A precious material is measured, weighed and stamped with its hallmark or purity notations 111 for self-authentication 503. The precious material is a metal or stone of value equivalent to the value of the article. The stamped and certified precious material is disposed in a cavity in the middle layer 504.

In one embodiment, the cavity, hole or modified region in the middle layer is cut to the exact size and shape of the precious material (or within a percentage thereof) so that the precious material is securely fitted in the middle layer (or inset or outset relative thereto). In some embodiments, the middle layer may be printed with additional symbols and markings to identify and authenticate the article 505. The top layer and the bottom layer are adhered to the middle layer in order to laminate the middle layer comprising the precious material 506.

In part, the articles disclosed herein may provide intrinsic value by way of inclusion of high-purity gold. In one embodiment, a laminated polymer construction provides tamper-resistant enclosure for gold. Further, the polymer substrate provides advanced security features that support counterfeit resistance. In one embodiment, the middle or core layer of a suitable polymer based synthetic paper provides a tear-proof, tough substrate, base, foundation or core in which the precious metal is embedded.

In one embodiment, the precious metal is patterned such that appearance of precious metal changes when viewed from two or more viewing angles. This may be imparted by a proprietary hologram or optically variable foil.

One or more optically transparent polymer layers can be laminated over the middle layer and the precious metal in various embodiments. In one embodiment, one or more of the polymer layers includes PET. Further, the uniform thickness provided by the 3-layer system allows for uniform stacking and storage of multiple articles. It is desirable to maintain a robust border where all three layers of polymer are laminated around the unitary precious metal structure secured by the article. This arrangement restricts access to the metal component and simultaneously guards against deliberate delamination attempts or inadvertent delamination resulting from wear-and-tear. Thus, extending the cavity to the edge of the article is not desirable in some embodiments. The cavity does span the thickness of the middle layer in various embodiments.

Figure 6A:
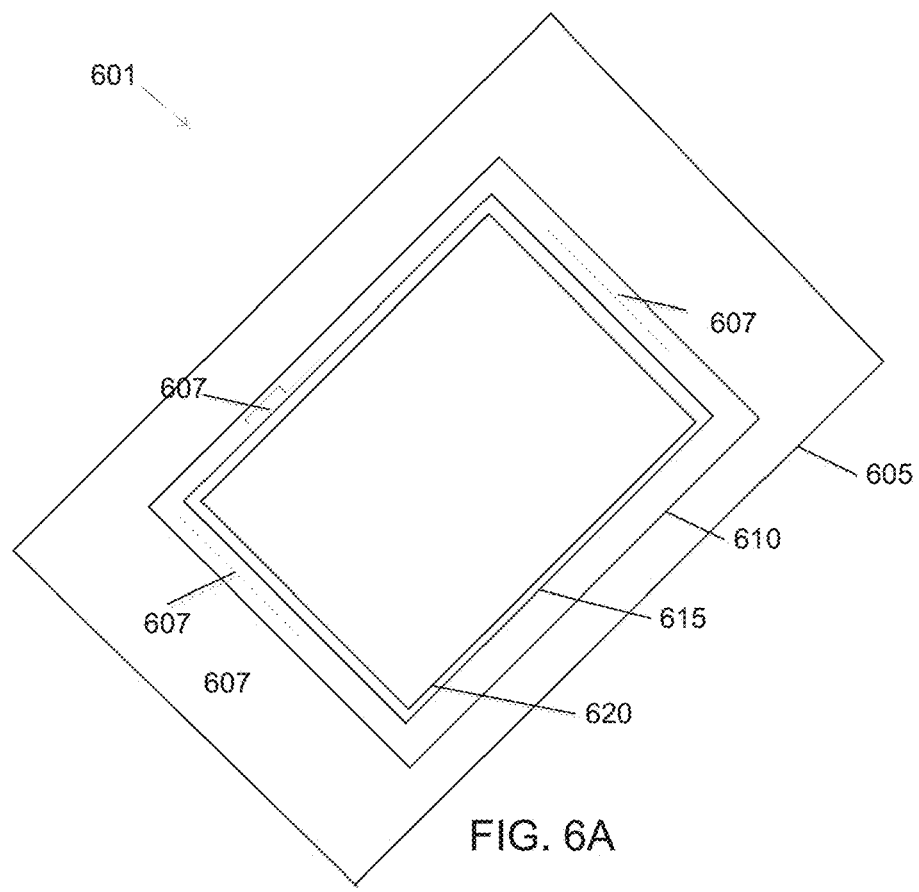
FIGS. 6A and 6B are top views of various articles that incorporate a zone or region of anti-tampering/anti-counterfeiting elements relative to a precious metal containing portion of the article.
Figure 6B:
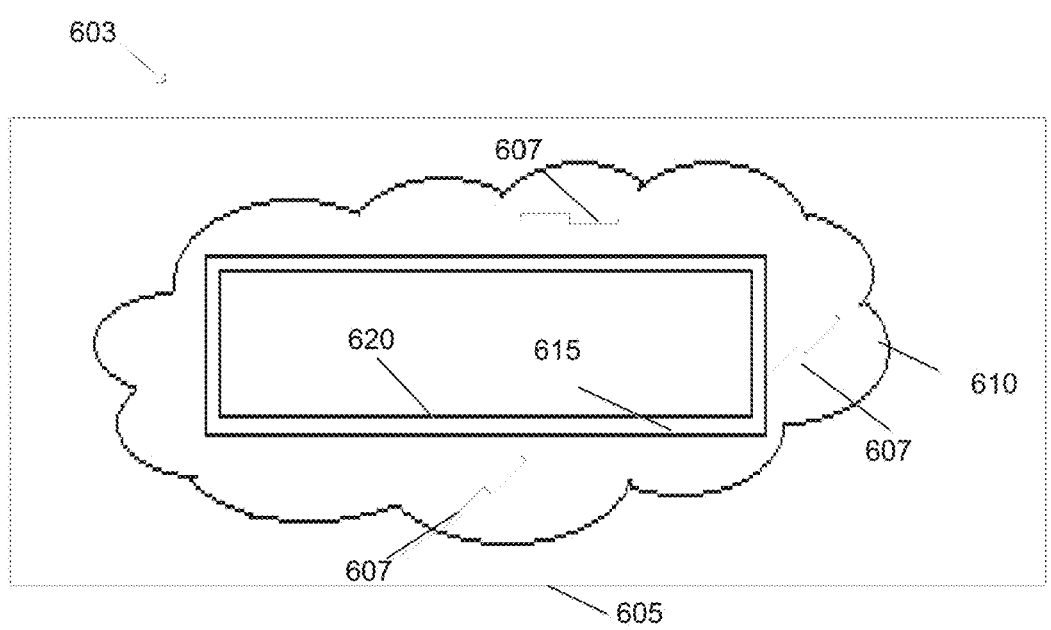

In various embodiments, it is desirable to safeguard a zone or region oriented relative to the precious material secured in the article by including tamper resistant elements relative to such a zone. Various types of tamper-resistant elements can be used. FIGS. 6A and 6B show exemplary embodiments of articles 601 and 603 that include one or more polymer layers 605 and one or more tamper-resistant elements 607. These elements are overlaid relative to the precious metal and contact or are integral with the portions of the upper polymer layer and/or the bottom polymer layer that sandwich or bound the precious metal. In some embodiments, a gap or other region 615 is adjacent the solid unitary element 620.

In this way, the tamper resistant elements 607 are disposed in a zone or region 610 relative to the precious metal or material. These elements 607 can be disposed within, formed from, or otherwise arranged relative to polymer layer 605 in the vicinity of the precious solid unitary element 620. If someone attempts to cut or otherwise tamper with the article, they would damage or interact with a tamper resistant element in zone or region 610. As a result, any attempts to modify or tamper with the article and the unitary element contained therein can be detected. In some instances, the tamper resistant elements are designed to prevent cutting or modifications to the article.

In general, reference to tamper-resistant elements and anti-counterfeiting elements and variations thereof can be used interchangeably. These elements generally include various types of embedded or attached structural elements or changes made to the polymer layers of the article. Examples of tamper-resistant elements include intaglio printing, raised ink, ultraviolet visible elements, infrared visible elements, patterned surface regions, small print elements, machine readable element, hologram, a magnetic thread, micro-perforations, embossed foil, optically verifiable indicia, surface embossing, proprietary colors of ink, optically variable ink, ultra-violet ink, micro-RFID technology, combinations thereof, and other similar structures and techniques.

In one embodiment, an article or document that contains certain features that allow it to be readily determined as authentic and not a copy is self-authenticating. In addition, self-authentication can be achieved relative to a given article as disclosed and described herein through the inclusion of a specific weight of gold laminated within the article. This type of article or note cannot be duplicated with a photocopier, even if you could bypass the anti-copying feature for banknotes.

For various articles as described herein, the embedded precious metal such as gold of a specific weight—makes it unique and extremely difficult to alter or otherwise reproduce. To achieve the same weight and dimension of a given unitary precious metal object, costly materials and experimentation would be necessary. Other metals would not produce the required weight. Embodiments of the disclosure are designed to be virtually impossible to delaminate, replace the gold with a metal substitute, and re-laminate because of the mechanical and structural changes that will occur when pulling the adhesive off a polymer layer thus highly tamper evident. In one embodiment, a smartphone app or other software-based system can be used to read specially printed non-visible images that are virtually impossible to counterfeit.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The aspects, embodiments, features, and examples of the disclosure are to be considered illustrative in all respects and are not intended to limit the disclosure, the scope of which is defined only by the claims. Other embodiments, modifications, and usages will be apparent to those skilled in the art without departing from the spirit and scope of the claims.

The use of headings and sections in the application is not meant to limit the disclosure; each section can apply to any aspect, embodiment, or feature of the disclosure.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

More generally, as used herein, the term unitary construction or unitary encompasses embodiments that are of a singular construction as well as embodiments in two parts of combined to form a new part. Thus, if a metal workpiece is formed, deposited, or placed in an article, that metal workpiece is a unitary structure. As noted above, in other embodiments, the term "unitary" can also refer to an object that is a single piece. For example, an object formed from a single molding, deposition, or printing step, without assembly or addition of materials can be described as unitary or having a unitary structure.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. In addition, the term "substantially" refers to a ±10% variation from the nominal value. Accordingly, unless indicated to the contrary, the numerical parameters set forth in the specification and attached claims are approximations that may vary depending upon the desired properties sought to be obtained. In addition, the term "planar" can include variations relative to an ideal planar surface of ±1.00% from an ideal planar surface at one or more locations of such a surface.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

When values or ranges of values are given, each value and the end points of a given range and the values there between may be increased or decreased by 20%, while still staying within the teachings of the disclosure, unless some different range is specifically mentioned.

At the very least, and not as an attempt to limit the application of the doctrine of equivalents to the scope of the claims, each numerical parameter should at least be construed in light of the number of reported significant digits and by applying ordinary rounding techniques. Any specific value or range disclosed herein can vary by 10% with respect to the value or all values of a range.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure.

The disclosure may be embodied in other specific forms without departing from the spirit or essential characteristics thereof. The foregoing embodiments are therefore to be considered in all respects illustrative rather than limiting on the disclosure described herein. Scope of the disclosure is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed:

1. A self-authenticating article comprising:
    a bearer instrument comprising
        one or more anti-counterfeiting elements;
        a first flexible polymer layer;
        a second flexible polymer layer;
        a third flexible polymer layer sandwiched between the first flexible polymer layer and the second flexible polymer layer, wherein the third flexible polymer layer defines a cavity, the cavity defined by a border; and
        a solid unitary structure comprising a precious metal disposed in the cavity, wherein the one or more anti-counterfeiting elements is disposed relative to the border,
    wherein the first flexible polymer layer and the second flexible polymer layer are optically transparent, such that the solid unitary structure is visible through each such polymer layer,
    wherein the first flexible polymer layer is bonded to one side of the third flexible polymer layer and the second flexible polymer layer is bonded to other side of the third flexible polymer layer.

2. The self-authenticating article of claim 1 further comprising a visible indicium positioned relative to the precious metal and indicative of one or more parameters associated with the precious metal.

3. The self-authenticating article of claim 2 wherein the one or more parameters comprise one or more of a hallmark, a purity level ora weight, each associated with the precious metal.

4. The self-authenticating article of claim 1 wherein the first flexible polymer layer, the second flexible polymer layer, and the third flexible polymer layer are foldable.

5. The self-authenticating article of claim 1 wherein the one or more anti-counterfeiting are selected from the group consisting of a an anti-tampering element, a hologram, a magnetic thread, micro-perforations, foil, optically verifiable indicia, surface embossing, intaglio ink, optically variable ink, and ultra-violet ink.

6. The self-authenticating article of claim 1, wherein the precious metal comprises a patterned surface that reflects incident light in two or more directions.

7. The self-authenticating article of claim 1 wherein the bearer instrument has a length, a width and a thickness, wherein the thickness is substantially uniform along the length of the bearer instrument and wherein each of a size and a two-dimensional shape of each of the first, second and third flexible polymer layers are substantially the same.

8. The self-authenticating article of claim 7 wherein the length ranges from 6 inches to 6.5 inches, wherein the width ranges from 2.5 inches to 3 inches.

9. The self-authenticating article of claim 1 further comprising an adhesive disposed on the first flexible polymer layer and the second flexible polymer layer such that the third flexible polymer layer is bonded to each of the first flexible polymer layer and the second flexible polymer layer.

10. The self-authenticating article of claim 1 wherein the first flexible polymer layer and the second flexible polymer layer are thermally bonded to opposing side of the third flexible polymer layer and wherein thickness of solid unitary structure and third flexible polymer layer are substantially the same.

11. The self-authenticating article of claim 1 wherein the first flexible polymer layer and the second flexible polymer layer are bonded to the precious metal.

12. The self-authenticating article of claim 1 wherein the third polymer layer comprises one or more visible indicia.

13. The self-authenticating article of claim 1 wherein the bearer instrument has a specified weight displayed on one or more of the first, second, or third flexible polymer layers, wherein the specified weight is a weight of the solid unitary structure.

14. The self-authenticating article of claim 1 wherein the first flexible polymer layer, the second flexible polymer layer and the third flexible polymer layers are laminated together.

15. The article of claim 1 wherein the bearer instrument is foldable, wherein the precious metal is positioned to avoid fold formed in bearer instrument.

16. A self-authenticating article comprising:
a bearer instrument comprising
    an optically transparent flexible upper polymer layer;
    an optically transparent flexible lower polymer layer;
    a flexible middle polymer layer sandwiched between the optically transparent flexible upper polymer layer and the optically transparent lower polymer layer,
    wherein the flexible middle polymer layer defines a cavity, the cavity defined by a border,
    wherein the optically transparent flexible upper polymer layer and the optically transparent lower polymer layer are bonded to different sides of the flexible middle polymer layer,
    the flexible middle polymer layer defined by a first thickness;
a unitary solid defined by a top surface, a bottom surface and a second thickness, the unitary solid disposed between the flexible upper polymer layer and the flexible lower polymer layer, the unitary solid disposed in the cavity, the unitary solid comprising a precious metal, wherein the precious metal is visible through the optically transparent flexible upper polymer layer and the optically transparent lower polymer layer; and
one or more anti-counterfeiting elements arranged relative to the unitary solid.

17. The self-authenticating article of claim 16, wherein the first thickness and the second thickness are substantially the same.

18. The self-authenticating article of claim 16 wherein the unitary solid is a precious metal.

19. The self-authenticating article of claim 18 wherein the precious metal is gold, platinum, or silver.

20. A self-authenticating article comprising:
a bearer instrument comprising
one or more anti-counterfeiting elements;
a first flexible polymer layer comprising a first optically transparent window;
a second flexible polymer layer comprising a second optically transparent window;
a third flexible polymer layer sandwiched between the first flexible polymer layer and the second flexible polymer layer, wherein the third flexible polymer layer defines a cavity, the cavity defined by a border; and
a solid unitary structure comprising a precious metal disposed in the cavity, wherein the one or more anti-counterfeiting elements are disposed relative to the border, wherein the solid unitary structure is visible through the first optically transparent window and the second optically transparent window,
wherein the first flexible polymer layer and the second flexible polymer layer are bonded with one or more regions of the solid unitary structure and one or more regions of the third flexible polymer layer.

21. The article of claim 20 wherein the one or more anti-counterfeiting elements are selected from the group consisting of anti-tampering elements, security print from special inks and processes, embossed foil, holograms, serial numbers, glyphs, and bar codes.

* * * * *